US012598492B2

(12) United States Patent
Matsumura et al.

(10) Patent No.: US 12,598,492 B2
(45) Date of Patent: Apr. 7, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 293 days.

(21) Appl. No.: 18/286,464

(22) PCT Filed: Mar. 29, 2022

(86) PCT No.: PCT/JP2022/015527
§ 371 (c)(1),
(2) Date: Oct. 11, 2023

(87) PCT Pub. No.: WO2022/220105
PCT Pub. Date: Oct. 20, 2022

(65) Prior Publication Data
US 2024/0121641 A1 Apr. 11, 2024

(30) Foreign Application Priority Data

Apr. 12, 2021 (JP) ................................. 2021-067264

(51) Int. Cl.
*H04W 24/08* (2009.01)
*H04L 5/00* (2006.01)
*H04W 72/02* (2009.01)
*H04W 76/19* (2018.01)

(52) U.S. Cl.
CPC ........... *H04W 24/08* (2013.01); *H04L 5/0051* (2013.01); *H04W 72/02* (2013.01); *H04W 76/19* (2018.02)

(58) Field of Classification Search
None
See application file for complete search history.

(56) References Cited

U.S. PATENT DOCUMENTS

| | | | | |
|---|---|---|---|---|
| 2019/0268790 A1* | 8/2019 | Kwon | .................. | H04B 17/309 |
| 2020/0350972 A1* | 11/2020 | Yi | .......................... | H04B 7/088 |
| 2020/0367272 A1* | 11/2020 | Ge | ........................ | H04L 1/1812 |
| 2021/0050968 A1* | 2/2021 | Yi | .......................... | H04L 5/0051 |

(Continued)

FOREIGN PATENT DOCUMENTS

WO 2020/246014 A1 12/2020

OTHER PUBLICATIONS

International Search Report issued in PCT/JP2022/015527 on Jun. 21, 2022 (5 pages).

(Continued)

*Primary Examiner* — Otis L Thompson, Jr.
(74) *Attorney, Agent, or Firm* — Osha Bergman Watanabe & Burton LLP

(57) ABSTRACT

A beam failure is appropriately detected. A terminal according to an aspect of the present disclosure includes a control section that, when a set of a reference signal (RS) index corresponding to a resource for beam failure detection (BFD) is not configured using higher layer signaling and a specific parameter is configured, selects up to a given number of control resource sets (CORESETs) for determining the RS index to be included in the set in accordance with a specific rule, and a receiving section that evaluates radio link quality, based on an RS corresponding to the RS index.

4 Claims, 5 Drawing Sheets

(56)     References Cited

U.S. PATENT DOCUMENTS

| | | | | |
|---|---|---|---|---|
| 2021/0105765 | A1* | 4/2021 | Cirik | H04B 7/06964 |
| 2021/0376909 | A1* | 12/2021 | Khoshnevisan | H04W 36/305 |
| 2022/0103232 | A1* | 3/2022 | Zhou | H04W 76/19 |
| 2022/0104036 | A1* | 3/2022 | Zhou | H04W 24/04 |
| 2022/0104037 | A1* | 3/2022 | Zhou | H04B 7/06964 |
| 2022/0124860 | A1* | 4/2022 | Guo | H04B 7/0695 |
| 2022/0132517 | A1* | 4/2022 | Zhu | H04L 5/0051 |
| 2022/0240178 | A1* | 7/2022 | Yang | H04W 72/54 |
| 2023/0032365 | A1* | 2/2023 | Bai | H04B 7/06964 |
| 2023/0046074 | A1* | 2/2023 | Zhang | H04B 7/06968 |
| 2023/0067031 | A1* | 3/2023 | Grossmann | H04L 5/0051 |
| 2023/0164865 | A1* | 5/2023 | Kang | H04B 7/06968 370/329 |
| 2024/0214142 | A1* | 6/2024 | Muruganathan | H04B 7/088 |

OTHER PUBLICATIONS

Written Opinion of the International Searching Authority issued in PCT/JP2022/015527 on Jun. 21, 2022 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), detecting a beam failure and performing a procedure of switching to another beam (which may be referred to as a beam failure recovery (BFR) procedure, BFR, or the like) has been under study.

For BFR, the UE detects a beam failure by using configured reference signal resources. On the other hand, when the UE is not configured with the resources, a scheme has been under study in which the UE uses, as a set of indices corresponding to the resources, up to two reference signal indices corresponding to a transmission configuration indication (TCI) state (TCI-state) of a control resource set (CORESET).

Accordingly, when the UE is not configured with the resources and is configured with more than two CORESETs, the UE needs to determine up to two indices to be included in the set among more than two indices corresponding to these CORESETs.

However, how to select the index(es) to be included in the set in such a case has not been studied. Unless this is clearly defined, a beam failure cannot be appropriately detected, and communication throughput may be reduced.

In view of this, the present disclosure has one object to provide a terminal, a radio communication method, and a base station that enable appropriate detection of a beam failure.

Solution to Problem

A terminal according to an aspect of the present disclosure includes a control section that, when a set of a reference signal (RS) index corresponding to a resource for beam failure detection (BFD) is not configured using higher layer signaling and a specific parameter is configured, selects up to a given number of control resource sets (CORESETs) for determining the RS index to be included in the set in accordance with a specific rule, and a receiving section that evaluates radio link quality, based on an RS corresponding to the RS index.

Advantageous Effects of Invention

According to an aspect of the present disclosure, a beam failure can be appropriately detected.

Figure 1:
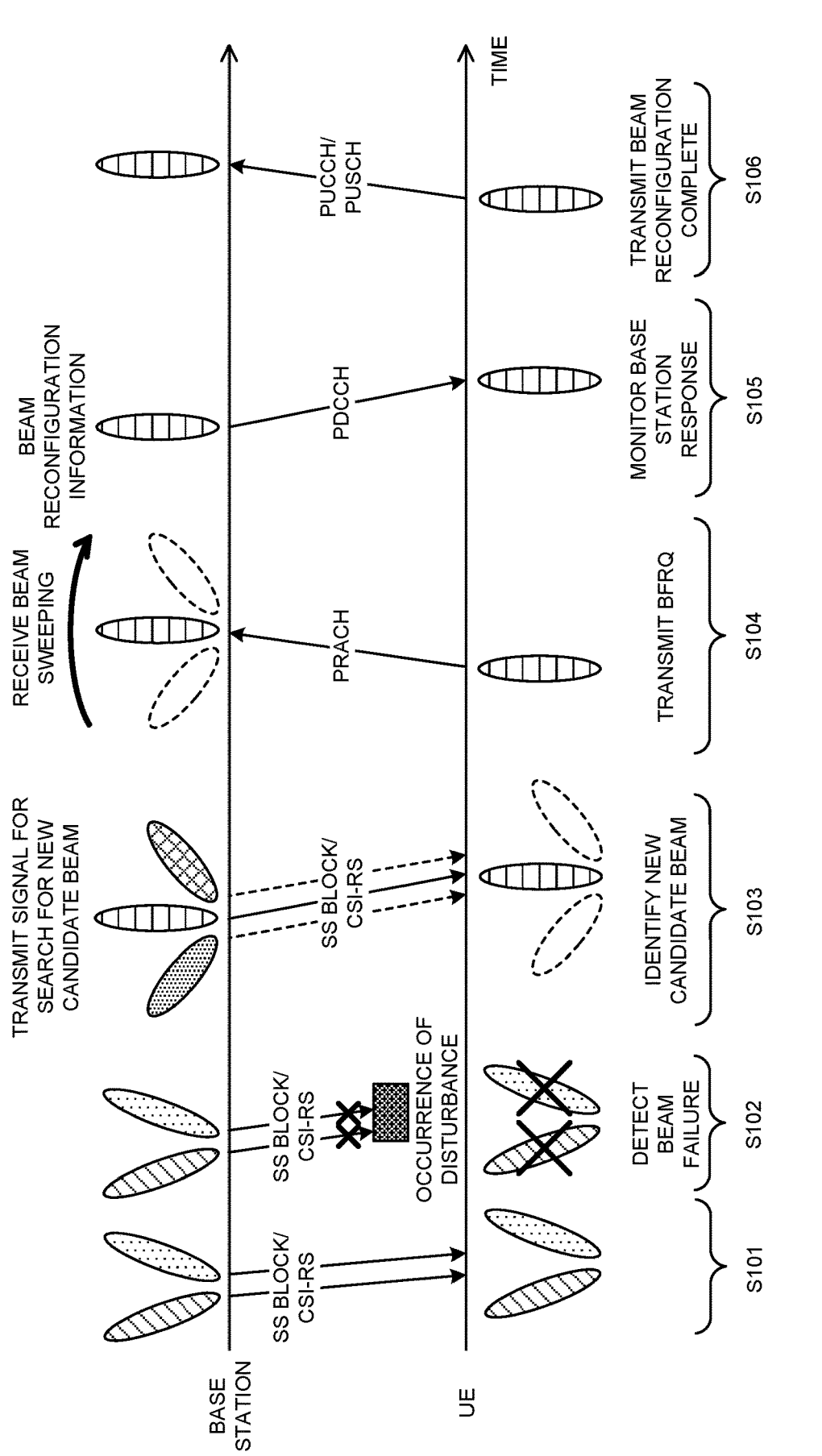
FIG. 1 is a diagram to show an example of a beam failure recovery procedure in Rel-15 NR.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is referred to as a signal/channel) based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case in which the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) using higher layer signaling or physical layer signaling, or a combination of these.

Note that, in the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

Note that the channel/signal as a target to which the TCI state is applied may be referred to as a target channel/reference signal (target channel/RS) or simply as a target or the like, and the another signal may be referred to as a reference signal (RS), a source RS, or simply as a reference or the like.

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), a reference signal for QCL detection (also referred to as a QRS), a demodulation reference signal (DMRS), and the like.

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The RS for QCL type X for the TCI state may mean the RS in the QCL type X relation with (the DMRS for) a given channel/signal, and the RS may be referred to as a QCL source of the QCL type X for the TCI state.

(BFR)

In NR, performing communication by using beamforming has been under study. In order to reduce occurrence of a radio link failure (RLF), the following scheme has been under study: when quality of a specific beam is deteriorated, a procedure of switching to another beam (which may be referred to as beam recovery (BR), beam failure recovery (BFR), L1/L2 (Layer 1/Layer 2) beam recovery, or the like) is performed. Note that the BFR procedure may be simply referred to as BFR.

Note that a beam failure in the present disclosure may be referred to as a link failure.

FIG. 1 is a diagram to show an example of a beam failure recovery procedure in Rel-15 NR. The number of beams and the like are merely an example, and this is not restrictive.

In an initial state (Step S101) of FIG. 1, the UE performs measurement based on RS resources transmitted using two beams. The RS may be at least one of the SSB and the CSI-RS. The RS measured in Step S101 may be referred to as an RS for beam failure detection (BFD-RS (Beam Failure Detection RS)) or the like. The beam failure detection may be simply referred to as failure detection.

In Step S102, radio waves from the base station are disturbed, and accordingly the UE cannot detect the BFD-RS (or received quality of the RS deteriorates). Such disturbance may occur due to an obstruction, fading, interference, or the like between the UE and the base station, for example.

When a given condition is satisfied, the UE detects a beam failure. For example, when a BLER (Block Error Rate) is less than a threshold regarding all of the configured BFD-RSs, the UE may detect occurrence of a beam failure. When occurrence of a beam failure is detected, a lower layer (physical (PHY) layer) of the UE may report (indicate) a beam failure instance to a higher layer (MAC layer).

Note that the criterion of the determination is not limited to the BLER, and may be reference signal received power in the physical layer (L1-RSRP (Layer 1 Reference Signal Received Power)). Note that the RSRP according to the present disclosure may be interpreted as RSRQ (Reference Signal Received Quality), SINR (Signal to Interference plus Noise Ratio), or information related to other power or quality.

Instead of the RS measurement or in addition to the RS measurement, beam failure detection may be performed based on the PDCCH or the like. It may be expected that the BFD-RS is quasi-co-located (QCL) with the DMRS of the PDCCH monitored by the UE.

Information related to the BFD-RS (for example, an index, a resource, a number, the number of ports, precoding, and the like of the RS), information related to beam failure detection (BFD) (for example, the threshold described above), and the like may be configured for (reported to) the UE by using higher layer signaling or the like. The information related to the BFD-RS may be interchangeably interpreted as information related to resources for BFD, information related to a BFD-RS resource, or the like.

When the MAC layer of the UE receives a beam failure instance report from the PHY layer of the UE, the MAC layer may start a given timer (which may be referred to as a beam failure detection timer). When the MAC layer of the UE receives the beam failure instance report a given number of times (for example, "beamFailureInstanceMaxCount" that is configured in the RRC) or more by the time the timer expires, the MAC layer may trigger the BFR (for example, start any one of random access procedures to be described later).

When the base station receives no report from the UE or when the base station receives a given signal (beam recovery request in Step S104) from the UE, the base station may determine that the UE has detected a beam failure.

In Step S103, for the sake of beam recovery, the UE starts search for a new candidate beam to be used for new communication. The UE may measure a given RS to thereby select a new candidate beam corresponding to the RS. The RS measured in Step S103 may be referred to as an RS for new candidate beam identification (NCBI-RS (New Candidate Beam Identification RS)), a CBI-RS, a CB-RS (Candidate Beam RS), or the like. The NCBI-RS may be the same as or different from the BFD-RS. Note that the new candidate beam may be simply referred to as a candidate beam, a new beam, or the like.

The UE may determine a beam that satisfies a given condition and corresponds to the RS as the new candidate beam. For example, the UE may determine the new candidate beam, based on the RS whose L1-RSRP exceeds a threshold, out of the configured NCBI-RSs. Note that the criterion of the determination is not limited to the L1-RSRP. The L1-RSRP related to the SSB may be referred to as SS-RSRP. The L1-RSRP related to the CSI-RS may be referred to as CSI-RSRP.

Information related to the NCBI-RS (for example, a resource, a number, the number of ports, precoding, and the like of the RS), information related to new candidate beam identification (NCBI) (for example, the threshold described above), and the like may be configured for (reported to) the UE by using higher layer signaling or the like. The information related to the NCBI-RS may be acquired based on the information related to the BFD-RS. The information related to the NCBI-RS may be referred to as information related to resources for NCBI or the like.

Note that the BFD-RS, the NCBI-RS, or the like may be interpreted as a radio link monitoring reference signal (RLM-RS (Radio Link Monitoring RS)).

In Step S104, the UE that has identified the new candidate beam transmits a beam recovery request (BFRQ (Beam Failure Recovery reQuest)). The beam recovery request may be referred to as a beam recovery request signal, a beam failure recovery request signal, or the like.

The BFRQ may be, for example, transmitted by using at least one of the PUCCH, the PRACH, the PUSCH, and the configured grant PUSCH. The UE may transmit a preamble (also referred to as an RA preamble, a PRACH, or the like) as the BFRQ by using PRACH resources.

Information related to correspondence between a detected DL-RS (beam) and PRACH resources (RA preamble) may be configured for the UE by using higher layer signaling (RRC signaling or the like), for example.

The BFRQ may include information of the new candidate beam identified in Step S103. Resources for the BFRQ may be associated with the new candidate beam. Information of the beam may be reported by using a beam index (BI), a port index of a given reference signal, a resource index (for example, a CSI-RS resource indicator (CRI), an SSB resource indicator (SSBRI)), or the like.

In Step S105, the base station that has detected the BFRQ transmits a response signal (which may be referred to as a gNB response or the like) for the BFRQ from the UE. The response signal may include reconfiguration information (for example, configuration information of DL-RS resources) regarding one or a plurality of beams. The UE may determine at least one of a transmit beam and a receive beam to be used, based on beam reconfiguration information.

The response signal may be transmitted in a UE common search space of the PDCCH, for example. The response signal may be reported by using DCI (PDCCH) including a cyclic redundancy check (CRC) that is scrambled with an identifier (for example, a cell-radio RNTI (C-RNTI) of the UE. When the UE receives the PDCCH corresponding to the C-RNTI related to the UE itself, the UE may determine that contention resolution has succeeded.

The UE may monitor the response signal, based on at least one of a CORESET for BFR and a search space set for BFR.

Regarding the processing of Step S105, a period for the UE to monitor a response for the BFRQ from the base station (for example, the gNB) may be configured. The period may be referred to as, for example, a gNB response window, a gNB window, a beam recovery request response window, or the like. When there is no gNB response detected in the window period, the UE may perform retransmission of the BFRQ.

In Step S106, the UE may transmit a message indicating that beam reconfiguration has completed to the base station. For example, the message may be transmitted on the PUCCH, or may be transmitted on the PUSCH.

Beam recovery success (BR success) may indicate a case in which the processing has reached Step S106, for example. In contrast, beam recovery failure (BR failure) may correspond to a case in which, for example, the number of times of BFRQ transmission has reached a given number of times, or a beam failure recovery timer (Beam-failure-recovery-Timer) has expired.

Note that the numbers of these steps are merely numbers for the sake of description, and a plurality of steps may be collected together, or the order thereof may be changed. Whether or not the BFR is performed may be configured for the UE by using higher layer signaling.

Incidentally, in Rel. 15/16 NR, the base station can configure a maximum of two resources for BFD per BWP for the UE by using higher layer signaling. For example, the UE may be provided with resources related to the purpose of the beam failure ("beamFailure") in resource configuration information for failure detection (for example, a higher layer parameter "failureDetectionResourcesToAddModList", "failureDetectionResources", or the like; hereinafter referred to as "failureDetectionResources").

For example, for each BWP of one serving cell, the UE can be provided with a set of periodic (P)-CSI-RS resource configuration indices (for example, non-zero power CSI-RS resource IDs), using the resource configuration information for failure detection. The set may be referred to as a set $q_0$ bar (here, "$q_0$ bar" is a representation in which an overline is placed over "$q_0$"), an index set, or the like. The set is hereinafter simply referred to as a "set go".

The set $q_0$ of P-CSI-RS resources explicitly provided using the resource configuration information for failure detection may be referred to as an explicit BFD-RS, explicit BFD-RS resources, or the like.

Based on the RS resources corresponding to the indices included in the set $q_0$, the UE may perform at least one of radio link quality evaluation, channel measurement, L1-RSRP measurement, and the like, and detect a beam failure.

For example, the physical layer in the UE evaluates the radio link quality in accordance with the set $q_0$ of resource configurations for a threshold $Q_{out,LR}$. For the set $q_0$, the UE may evaluate the radio link quality in accordance with the P-CSI-RS resource configurations quasi-co-located (QCLed) with the DM-RS for PDCCH reception monitored by the UE, or the SS/PBCH blocks in a PCell or a PSCell quasi-co-located with the DM-RS for PDCCH reception monitored by the UE.

In other words, the BFD-RS may be quasi-co-located (QCL) with the PDCCH, regardless of whether the BFD-RS is an explicit BFD-RS or an implicit BFD-RS.

Note that, in the present disclosure, being provided with the above-described higher layer parameter (resource configuration information for failure detection) indicating the information of the indices corresponding to the resources for BFD may be interchangeably interpreted as being configured with the resources for BFD, being configured with the BFD-RS, or the like. In the present disclosure, the resources for BFD, the set $q_0$ of periodic CSI-RS resource configuration indices or SSB indices, the BFD-RS, and the like may be interchangeably interpreted as each other.

In contrast, Rel. 15/16 NR defines that, when the UE is not configured with the resources for BFD, the UE determines to include, in the set $q_0$, the periodic CSI-RS resource configuration indices having the same value as RS index(es) in an RS set indicated by the TCI state of the CORESET used for monitoring the PDCCH.

For example, when the UE is not provided with the set $q_0$ by the resource configuration information for failure detection (failureDetectionResources) for one BWP of the serving cell, the UE determines to include, in the set $q_0$, the P-CSI-RS resource configuration indices having the same value as RS index(es) in an RS set indicated by the TCI state ("TCI-State") for a corresponding CORESET used by the UE to monitor the PDCCH.

The set $q_0$ determined when the resources for BFD are not configured may be referred to as an implicit BFD-RS, implicit BFD-RS resources, or the like. Note that, in the present disclosure, the implicit BFD-RS may mean the BFR-RS determined by the UE regarding the BWP of the serving cell in which the set $q_0$ is not provided by the resource configuration information for failure detection. In the present disclosure, a case in which the UE is not provided with the set $q_0$ by the resource configuration information for failure detection may be interchangeably interpreted as a case in which the UE is not provided with the set $q_0$ by the resource configuration information for failure detection regarding a given BWP of a given serving cell, a case in which the UE is not configured with the resources for BFD regarding the BWP of the serving cell, and the like.

Note that, when there are two RS indices in one TCI state, the set $q_0$ includes RS indices configured with QCL type D for a corresponding TCI state. The UE expects that the set $q_0$ includes up to two RS indices. The UE assumes a single port RS in the set $q_0$.

(Multi-TRP)

In NR, a scheme in which one or a plurality of transmission/reception points (TRPs) (multi-TRP (MTRP)) perform DL transmission to the UE has been under study. A scheme in which the UE performs UL transmission to one or a plurality of TRPs has been under study as well.

In an active downlink Bandwidth Part (BWP) of a given serving cell, when the UE is not provided with a CORESET pool index (higher layer parameter CORESETPoolIndex) or is provided with a value of the CORESET pool index=0 regarding one or more first CORESETs, and is provided with the value of the CORESET pool index=1 regarding one or more second CORESETs, the UE may assume that multi-DCI based multi-TRP is to be used (control is performed based thereon).

As described above, when the UE is configured with more than two CORESETs, and is not provided with the set $q_0$ by the resource configuration information for failure detection, the UE needs to determine up to two indices to be included in the set $q_0$ among more than two RS indices corresponding to these CORESETs. The UE may be configured with more than two (for example, three) CORESETs per BWP. For example, when the multi-DCI based multi-TRP is used, a total of five CORESETs may be configured.

However, how to select the index(es) to be included in the set $q_0$ in such a case has not been studied. When the set $q_0$ is not provided by the resource configuration information for failure detection, existing specifications of Rel. 15/16 define that a maximum of two BFD-RSs are selected based on the TCI state of the CORESET, but do not define anything regarding the selection method, and the selection method is thus dependent upon implementation of the UE. Unless the selection method of the BFD-RS is clearly defined, a beam failure cannot be appropriately detected, and communication throughput may be reduced.

In view of this, the inventors of the present invention came up with the idea of a method of determining a reference signal index for appropriately detecting a beam failure.

Embodiments according to the present disclosure will be described in detail with reference to the drawings as follows. The radio communication methods according to respective embodiments may each be employed individually, or may be employed in combination.

Note that, in the present disclosure, "A/B" may mean "at least one of A and B".

In the present disclosure, activate, deactivate, indicate, select, configure, update, determine, and the like may be interchangeably interpreted as each other.

In the present disclosure, an RRC, an RRC parameter, an RRC message, a higher layer parameter, an information element (IE), and a configuration may be interchangeably interpreted as each other. In the present disclosure, a MAC CE, an update command, and an activation/deactivation command may be interchangeably interpreted as each other. In the present disclosure, to support, to control, to be able to control, to operate, and to be able to operate may be interchangeably interpreted as each other.

In the present disclosure, a sequence, a list, a set, a group, and the like may be interchangeably interpreted as each other.

In the present disclosure, a panel, a beam, a panel group, a beam group, an Uplink (UL) transmission entity, a TRP, spatial relation information (SRI), a spatial relation, a control resource set (CORESET), a Physical Downlink Shared Channel (PDSCH), a codeword, a base station, a given antenna port (for example, a demodulation reference signal (DMRS) port), a given antenna port group (for example, a DMRS port group), a given group (for example, a code division multiplexing (CDM) group, a given reference signal group, or a CORESET group), a given resource (for example, a given reference signal resource), a given resource set (for example, a given reference signal resource set), a CORESET pool, a PUCCH group (PUCCH resource group), a spatial relation group, a downlink TCI state (DL TCI state), an uplink TCI state (UL TCI state), a unified TCI state, and the like may be interchangeably interpreted as each other.

The panel may be related to at least one of a group index of an SSB/CSI-RS group, a group index of a group-based beam report, and a group index of an SSB/CSI-RS group for a group-based beam report.

A panel Identifier (ID) and a panel may be interchangeably interpreted as each other. In other words, a TRP ID and a TRP, a CORESET group ID and a CORESET group, and the like may be interchangeably interpreted as each other.

In the present disclosure, an index, an identifier (ID), an indicator, a resource ID, and the like may be interchangeably interpreted as each other. In the present disclosure, a sequence, a list, a set, a group, a cluster, a subset, and the like may be interchangeably interpreted as each other.

In the present disclosure, it may be assumed that a single PDCCH is supported when the multi-TRP uses an ideal backhaul. It may be assumed that a multi-PDCCH is supported when the multi-TRP uses a non-ideal backhaul.

Note that the ideal backhaul may be referred to as DMRS port group type 1, reference signal related group type 1, antenna port group type 1, CORESET pool type 1, or the like. The non-ideal backhaul may be referred to as DMRS port group type 2, reference signal related group type 2, antenna port group type 2, CORESET pool type 2, or the like. Terms are not limited to these.

In the present disclosure, multi-TRP, a multi-TRP system, multi-TRP transmission, and a multi-PDSCH may be interchangeably interpreted as each other.

In the present disclosure, single DCI (sDCI), a single PDCCH, a multi-TRP system based on the single DCI, sDCI based MTRP, and activation of two TCI states on at least one TCI code point may be interchangeably interpreted as each other.

In the present disclosure, multi-DCI (mDCI), a multi-PDCCH, a multi-TRP system based on the multi-DCI, mDCI based MTRP, and configuration of two CORESET pool indices or CORESET pool index=1 (or a value of 1 or greater) may be interchangeably interpreted as each other.

Note that, in the present disclosure, a "first TRP", "TRP1", a "first CORESET", and a "CORESET not provided with the CORESET pool index or provided with a value of the CORESET pool index=0" may be interchangeably interpreted as each other. The "first CORESET" may mean one or a plurality of first CORESETs.

Note that, in the present disclosure, a "second TRP", "TRP2", a "second CORESET", and a "CORESET provided with a value of the CORESET pool index=1" may be interchangeably interpreted as each other. The "second CORESET" may mean one or a plurality of second CORESETs.

Note that description of the following embodiments assumes that there are a maximum of two implicit BFD-RSs. However, this is not restrictive. In the present disclosure, "two" may be interchangeably interpreted as being "multiple" (for example, three or more). The following embodiments may or may not be limited to a case of the multi-TRP. (Radio Communication Method)

First Embodiment

A first embodiment relates to determination of the implicit BFD-RS.

In the first embodiment, when the UE is not provided with the set $q_0$ by the resource configuration information for failure detection (failureDetectionResources) regarding a given BWP of a given serving cell, the UE may determine, as the CSI-RS for the set $q_0$, the CSI-RS provided for an active TCI state for PDCCH reception in the CORESET related to the search space set in order from the search space set from the smallest monitoring period. The UE may determine to include the index of the determined CSI-RS in the set $q_0$.

When more than one CORESET is related to a plurality of search space sets having the same monitoring period, the UE may determine the CSI-RS in order from the CORESET from the largest CORESET index.

In other words, for the implicit BFD-RS, the UE may select (determine) two CORESETs among CORESETs having an active TCI state, with the first priority being given to how small the monitoring period of a corresponding search space set is and the second priority being given to how large the CORESET ID is, and determine to include the index of the RS identified based on each of the CORESETs in the set $q_0$. The UE may include the index of the RS provided by the active TCI state of each of the CORESETs in the set $q_0$, for example.

Modifications of First Embodiment

When the UE is not provided with the set $q_0$ by the resource configuration information for failure detection regarding a given BWP of a given serving cell, the UE may select two CORESETs satisfying one of the following rules or a combination of these among the configured CORESETs, and determine to include the index of the RS identified based on each of the CORESETs in the set $q_0$:

CORESET configured/not configured with a TCI state,

CORESET having/not having an active TCI state,

CORESET corresponding to/not corresponding to a specific CORESET pool index (for example, CORESET pool index=0, 1), CORESET with its related search space set having the largest/smallest monitoring period, CORESET having the largest/smallest CORESET ID, CORESET having the largest/smallest CSI-RS (reference RS) period corresponding to a TCI state, CORESET with its related search space set being a specific search space set (for example, a common search space set, a UE-specific search space set), CORESET in the latest monitoring slot (monitored in the latest monitoring slot), CORESET corresponding to the first CORESET/second CORESET.

The order of priorities for these rules may be any order (these rules may be applied in any order to determine the CORESETs). For example, when there are a plurality of CORESETs satisfying a given rule, the UE may select one or more CORESETs among these CORESETs, based on another rule.

Note that, in the present disclosure, "the smallest" may be interchangeably replaced with "the largest", "the highest", "the lowest", "of a specific value", "i-th (i is an integer, for example 1, 2, . . . )", "from the smallest", "from the largest", "two from the smallest", "two from the largest", and the like. In the present disclosure, "small" and "large" may be interchangeably replaced with each other.

For example, when the UE is not provided with the set $q_0$ by the resource configuration information for failure detection regarding a given BWP of a given serving cell, the UE may determine, as the CSI-RS for the set $q_0$, the CSI-RS provided for an active TCI state for PDCCH reception in the CORESET having the smallest CORESET ID in the latest monitoring slot.

Alternatively, when the UE is not provided with the set $q_0$ by the resource configuration information for failure detection regarding a given BWP of a given serving cell, the UE may determine, as the CSI-RS for the set $q_0$, the CSI-RS provided for an active TCI state for PDCCH reception in the CORESET having the smallest CORESET ID.

In the selection of the CORESET, for example, with the priority being given to how small the CORESET ID is, the BFD of CORESET #0 which is considered to be the most significant can be suitably performed.

With the priority being given to how large the monitoring period is, a failure in the PDCCH having a long period, of which occurrence of failure is difficult to be detected, can be suitably detected. In contrast, with the priority being given to how small the monitoring period is, a failure in the PDCCH for low delay can be suitably detected.

With the priority being given to how large the CSI-RS period is, the BFD of the PDCCH which is considered to have relatively poor quality can be suitably performed. In contrast, with the priority being given to how small the CSI-RS period is, more accurate (reliable) BFD can be suitably performed.

With the priority being given to the CORESET corresponding to the common search space set, the BFD of the PDCCH which is generally considered more significant can be suitably performed. In contrast, with the priority being given to the CORESET corresponding to the UE-specific search space set, the BFD of the PDCCH which is significant for scheduling of the PDSCH, the PUSCH, and the like including a TCI state indication MAC CE can be suitably performed.

Note that the implicit BFD-RS may be determined for each CORESET pool index. In other words, for the implicit BFD-RS corresponding to CORESET pool index=0, the UE may select two CORESETs among the first CORESETs, based on one of the above rules or a combination of these, and determine to include the index of the RS identified based on each of the CORESETs in the set $q_0$ for CORESET pool index=0. For the implicit BFD-RS corresponding to CORESET pool index=1, the UE may select two CORESETs among the second CORESETs, based on one of the above rules or a combination of these, and determine to include the index of the RS identified based on each of the CORESETs in the set $q_0$ for CORESET pool index=1.

Note that, regarding the limitation on the number of BFD-RSs (a maximum of two in Rel. 15; in Rel. 16, the number is further limited by UE capability information (for example, maxTotalResourcesForOneFreqRange-r16) to be described in a second embodiment), the UE may assume that the limited number of BFD-RSs is the number for each CORESET pool index, or may assume that the limited number is a total number regarding all of the CORESET pool indices.

Note that the implicit BFD-RS may be determined from the CORESET of CORESET ID=0 (CORESET #0), or may be determined from the CORESETs except CORESET #0.

Note that, regarding the index of the RS included in the set $q_0$, the RS may be any RS (for example, an SSB/CSI-RS/TRS, or the like), or may be limited to a specific RS (for example, may be limited to a CSI-RS/TRS). In other words, the CSI-RS in the present disclosure may be interchangeably interpreted as at least one of any RS described above, the specific RS described above, or the like.

Note that, when two RSs for the TCI state for the CORESET corresponding to a given CORESET ID are configured (for example, an RS for QCL type D and an RS for QCL type A), the UE may include the index of one of the RSs (for example, the RS for QCL type D) in the set $q_0$, or may include the indices of both of the RSs in the set $q_0$.

According to the first embodiment described above, when the resources for BFD are not configured, the BFD-RS can be determined based on an appropriate CORESET. When link disconnection is handled in the same manner in the RLM and the BFR, link recovery can be made redundant by using the same CORESET, and when link disconnection is handled in different manners in the RLM and the BFR, link disconnection not covered in the RLM can be covered in the BFR.

Second Embodiment

A second embodiment relates to condition(s) for applying determination of the implicit BFD-RS in the first embodiment described above.

When one or a plurality of the following conditions are satisfied, the UE may determine the satisfying implicit BFD-RS of the first embodiment (may determine the implicit BFD-RS, based on the determination method of the first embodiment):

being configured with a specific parameter using higher layer signaling, report specific UE capability information (or support a UE capability corresponding to the information), the BFD-RS is used for the BFR for the PCell/PSCell, the BFD-RS is used for the BFR for the SCell.

When the UE is not configured with the specific parameter, the UE may determine the implicit BFD-RS in accordance with Rel. 15, for example, not based on the first embodiment. The specific parameter may be information for configuring the CORESET of CORESET pool index=1, information related to the multi-TRP, information for configuring the determination method of the BFR-RS, any RRC parameter for a specific release (for example, Rel. 16, or Rel. 17), or the like.

For example, the information for configuring the determination method of the BFR-RS may correspond to information indicating enabling of the determination method of the BFR-RS shown in the first embodiment (information with its value indicating "enable", which may be referred to as an "enabler").

For example, the specific parameter may be configured being included in configuration information for beam failure recovery. For example, the specific parameter may be included in the configuration information for beam failure recovery (for example, BeamFailureRecoveryConfig) for a special cell (SpCell, which includes a primary cell (PCell) and a primary secondary cell (PSCell)), or may be included in the configuration information for beam failure recovery (for example, BeamFailureRecoverySCellConfig) for a secondary cell (SCell).

The specific UE capability information may be UE capability information for a specific release (for example, Rel. 16, or Rel. 17). For example, the specific UE capability information may be at least one of the following:

information (for example, multiDCI-MultiTRP-r16) indicating whether or not the UE supports the multi-DCI based multi-TRP, information (for example, maxNumberCORESET-r16) indicating a maximum number of CORESETs configured for each BWP for each cell, information (for example, maxNumberCORESETPer-PoolIndex-r16) indicating a maximum number of CORESETs configured for each CORESET pool index for each BWP for each cell, information (for example, maxTotalResourcesForOne-FreqRange-r16) indicating a maximum value of a total number of SSB/CSI-RS/CSI-IM resources supported by the UE, for beam management, path loss measurement, BFD, RLM, new beam identification, and the like in one frequency range, information (for example, maxNumberResWithin-SlotAcrossCC-OneFR-r16) indicating a maximum value of a total number of SSB/CSI-RS/CSI-IM resources configured for measurements such as L1-RSRP measurement, L1-SINR measurement, path loss measurement, BFD, RLM, and new beam identi-fication within one slot over all of CCs in one frequency range, information (for example, maxNumberResAcrossCC-OneFR-r16) indicating a maximum value of a total number of SSB/CSI-RS/CSI-IM resources configured for measurements such as L1-RSRP measurement, L1-SINR measurement, path loss measurement, BFD, RLM, and new beam identification over all of CCs in one frequency range, information (for example, maxTotalResourcesForOne-FreqRange-r16) indicating a maximum value of a total number of SSB/CSI-RS/CSI-IM resources supported by the UE, for beam management, path loss measure-ment, BFD, RLM, new beam identification, and the like over a plurality of frequency ranges (for example, both of FR1 and FR2), information (for example, maxNumberResWithin-SlotAcrossCC-AcrossFR-r16) indicating a maximum value of a total number of SSB/CSI-RS/CSI-IM resources configured for measurements such as L1-RSRP measurement, L1-SINR measurement, path loss measurement, BFD, RLM, and new beam identi-fication within one slot over all of CCs over a plurality of frequency ranges, information (for example, maxNumberResAcrossCC-AcrossFR-r16) indicating a maximum value of a total number of SSB/CSI-RS/CSI-IM resources configured for measurements such as L1-RSRP measurement, L1-SINR measurement, path loss measurement, BFD, RLM, and new beam identification over all of CCs over a plurality of frequency ranges.

Note that "report specific UE capability information" in the above may be interpreted as "report UE capability information of a specific value". For example, the "UE capability information of a specific value" may be informa-tion (for example, maxNumberCORESET-r16) having the specific value (for example, 3 or greater) and indicating a maximum number of CORESETs configured for each BWP for each cell, or may be information (for example, maxNum-berCORESETPerPoolIndex-r16) having the specific value (for example, 3 or greater) and indicating a maximum number of CORESETs configured for each CORESET pool index for each BWP for each cell.

According to the second embodiment described above, the determination method of the implicit BFD-RS of the first embodiment can be used under an appropriate condition, and for example, an Rel-15 UE can be prevented from mistakenly using the determination method of the implicit BFD-RS of the first embodiment.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 2:
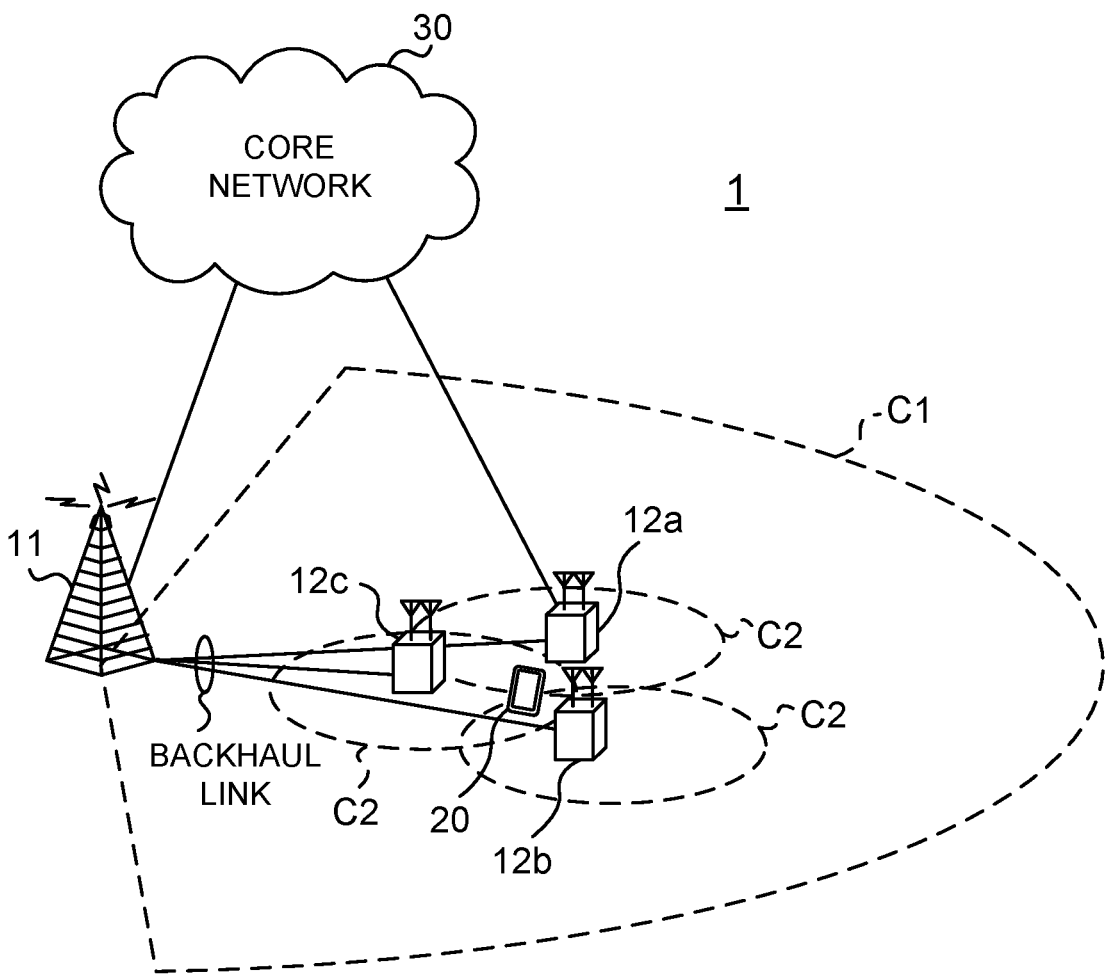
FIG. 2 is a diagram to show an example of a schematic structure of a radio communication system according to one embodiment.

FIG. 2 is a diagram to show an example of a schematic structure of the radio communication system according to one embodiment. The radio communication system 1 may be a system implementing a communication using Long Term Evolution (LTE), 5th generation mobile communica-tion system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Uni-versal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Con-nectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrange-ment, the number, and the like of each cell and user terminal 20 are by no means limited to the aspect shown in the diagram. Hereinafter, the base stations 11 and 12 will be collectively referred to as "base stations 10," unless speci-fied otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communi-cation is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 3:
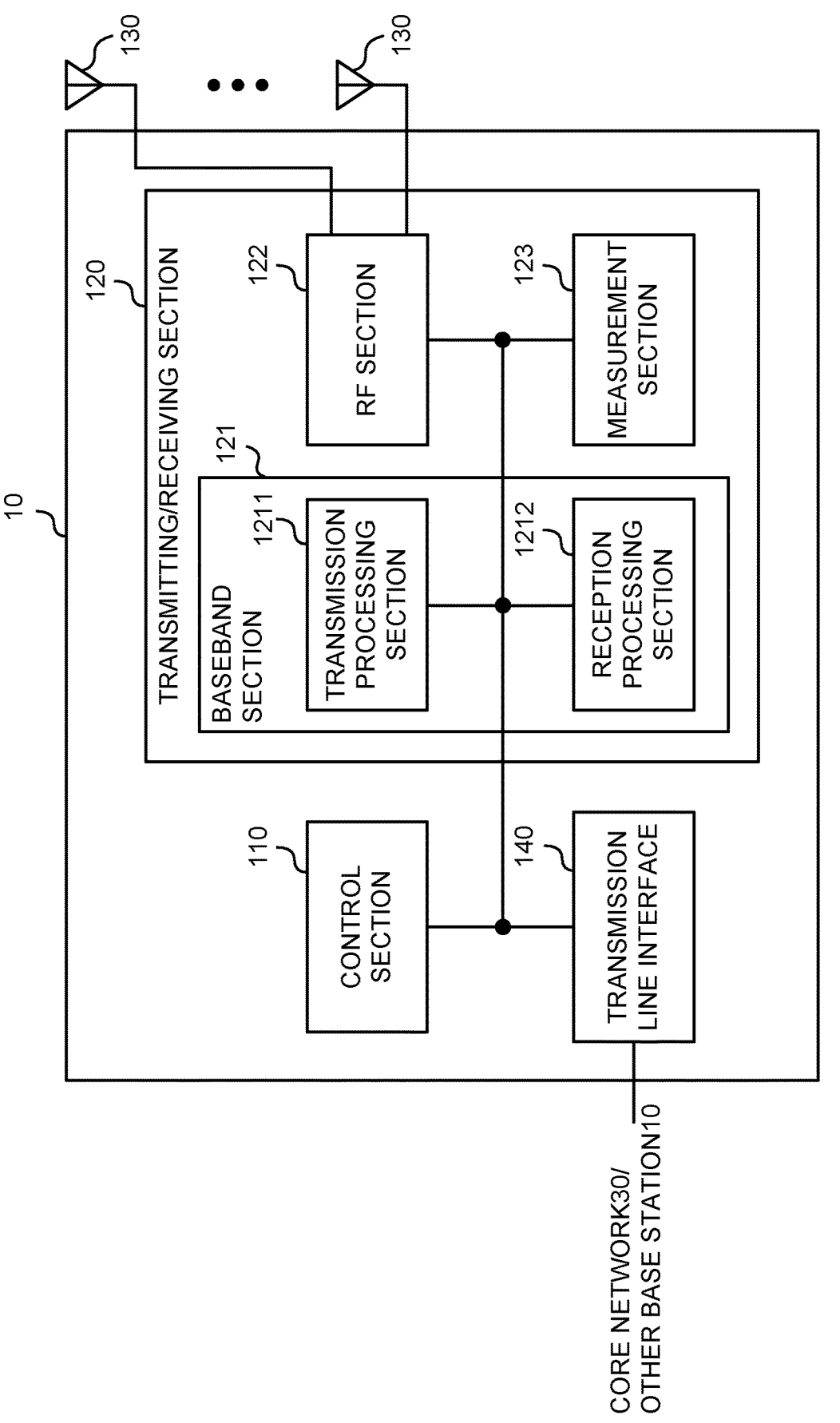
FIG. 3 is a diagram to show an example of a structure of a base station according to one embodiment.

FIG. 3 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas

130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may not configure a set of a reference signal (RS) index corresponding to a resource for beam failure detection (BFD) using higher layer signaling and may configure a specific parameter for a user terminal 20 (may transmit higher layer signaling for configuring the specific parameter).

The control section 110 may assume that the user terminal 20 selects up to a given number of control resource sets (CORESETs) for determining the RS index to be included in the set in accordance with a specific rule and evaluates radio link quality based on an RS corresponding to the RS index (RS index related to the selected CORESET(s)).

(User Terminal)

Figure 4:
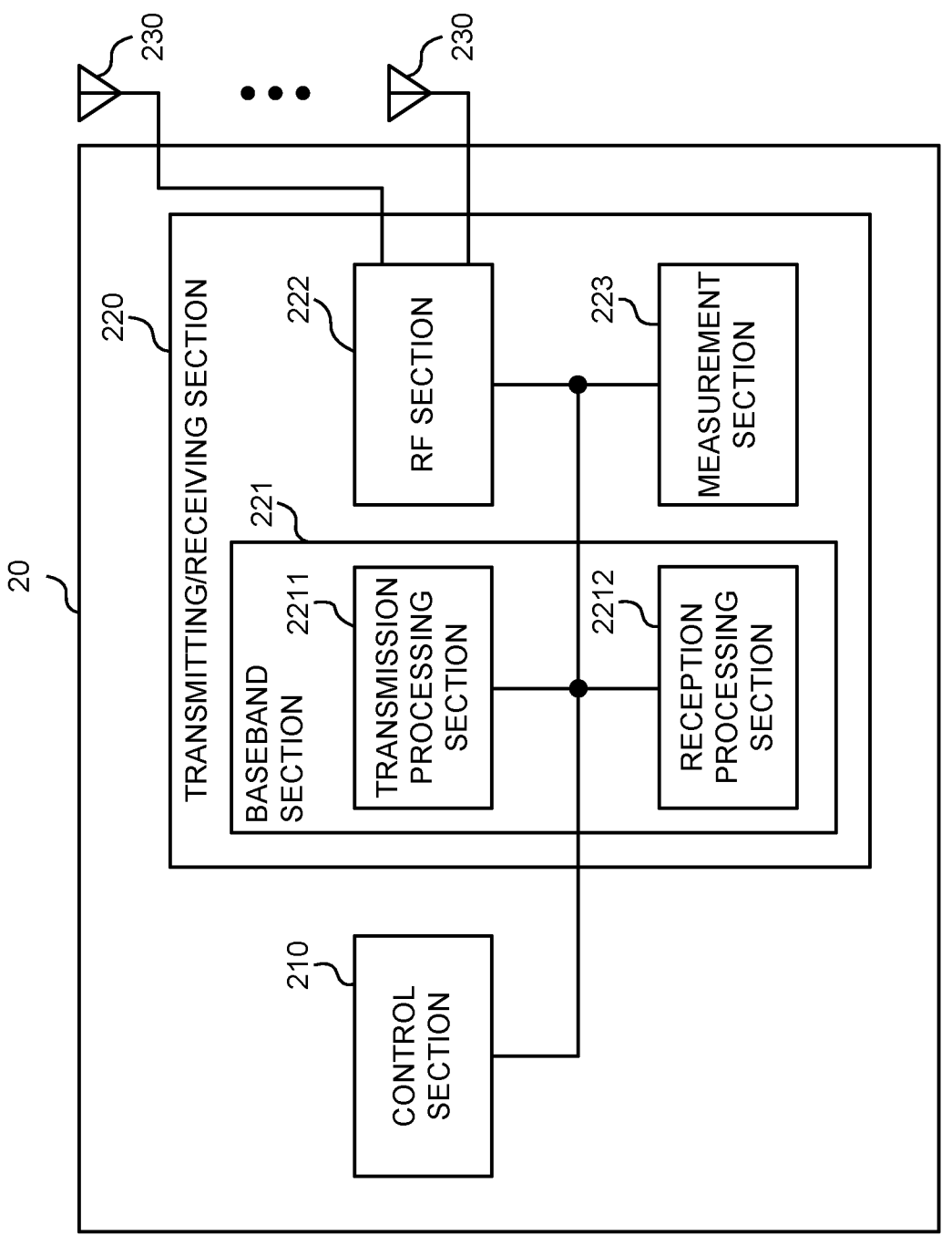
FIG. 4 is a diagram to show an example of a structure of a user terminal according to one embodiment.

FIG. 4 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that, when a set of a reference signal (RS) index corresponding to a resource for beam failure detection (BFD) is not configured using higher layer signaling and a specific parameter (parameter described in the second embodiment) is configured, the control section 210 may select up to a given number of control resource sets (CORESETs) for determining the RS index to be included in the set in accordance with a specific rule (one or more rules described in the first embodiment).

The transmitting/receiving section 220 may evaluate radio link quality, based on an RS corresponding to the RS index.

Further when the control section 210 reports specific capability information (UE capability information described in the second embodiment), the control section 210 may select up to the given number of the CORESETs for determining the RS index to be included in the set in accordance with the specific rule.

The specific rule may be a rule for selecting up to the given number of the CORESETs, with a first priority being given to how small a monitoring period of a corresponding search space set is and a second priority being given to how large an identifier of each of the CORESETs is.

The specific parameter may be reported being included in configuration information for beam failure recovery from the base station 10.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 5:
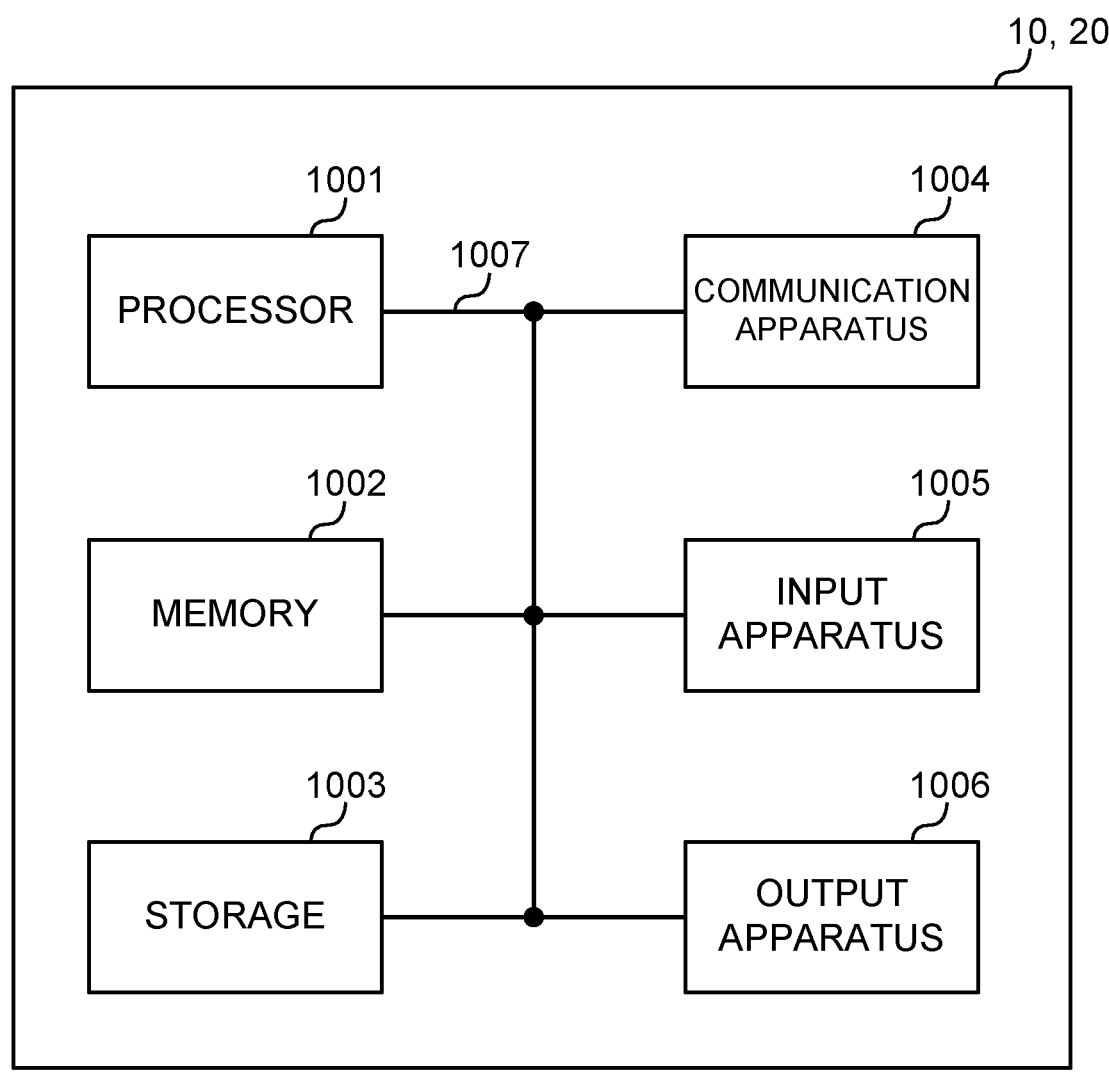
FIG. 5 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 5 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2021-67264 filed on Apr. 12, 2021, the entire contents of which are incorporated herein by reference.

What is claimed is:

1. A terminal comprising:
a receiver that receives, by a higher layer parameter, a control resource set (CORESET) pool index of a zeroth value and a CORESET pool index of a first value that is different from the zeroth value; and
a processor that, in a beam failure detection (BFD)-reference signal (RS) for PCell, PSCell and SCell beam failures, when a set of RS resource indices for BFD corresponding to the CORESET pool index of the zeroth value and a set of RS resource indices for BFD corresponding to the CORESET pool index of the first value are not configured by BFD resource settings, determines an RS provided for an active transmission configuration indication (TCI) state for physical downlink control channel (PDCCH) reception in a CORESET with a largest CORESET ID among multiple CORESETs corresponding to the CORESET pool index of the zeroth value as a set of RS resource indices for BFD corresponding to the CORESET pool index of the zeroth value, and determines an RS provided for an active TCI state for PDCCH reception in a CORESET with a largest CORESET ID among multiple CORE-SETs corresponding to the CORESET pool index of the first value as a set of RS resource indices for BFD corresponding to the CORESET pool index of the first value,
wherein a number of BFD-RSs limited by terminal capability information is a number for each of the CORE-SET pool index of the zeroth value and the CORESET pool index of the first value.

2. A radio communication method for a terminal, comprising:
receiving, by a higher layer parameter, a control resource set (CORESET) pool index of a zeroth value and a CORESET pool index of a first value that is different from the zeroth value; and
in a beam failure detection (BFD)-reference signal (RS) for PCell, PSCell and SCell beam failures, when a set of RS resource indices for BFD corresponding to the CORESET pool index of the zeroth value and a set of RS resource indices for BFD corresponding to the CORESET pool index of the first value are not configured by BFD resource settings, determining an RS provided for an active transmission configuration indication (TCI) state for physical downlink control channel (PDCCH) reception in a CORESET with a largest CORESET ID among multiple CORESETs corresponding to the CORESET pool index of the zeroth value as a set of RS resource indices for BFD corresponding to the CORESET pool index of the zeroth value, and determining an RS provided for an active TCI state for PDCCH reception in a CORESET with a largest CORESET ID among multiple CORESETs corresponding to the CORESET pool index of the first value as a set of RS resource indices for BFD corresponding to the CORESET pool index of the first value,
wherein a number of BFD-RSs limited by terminal capability information is a number for each of the CORE-SET pool index of the zeroth value and the CORESET pool index of the first value.

3. A base station comprising:
a transmitter that transmits, by a higher layer parameter, a control resource set (CORESET) pool index of a zeroth value and a CORESET pool index of a first value that is different from the zeroth value; and
a processor that assumes, in a beam failure detection (BFD)-reference signal (RS) for PCell, PSCell and SCell beam failures, when a set of RS resource indices for BFD corresponding to the CORESET pool index of the zeroth value and a set of RS resource indices for BFD corresponding to the CORESET pool index of the first value are not configured by BFD resource settings, that a terminal determines an RS provided for an active transmission configuration indication (TCI) state for physical downlink control channel (PDCCH) reception in a CORESET with a largest CORESET ID among multiple CORESETs corresponding to the CORESET pool index of the zeroth value as a set of RS resource indices for BFD corresponding to the CORESET pool index of the zeroth value, and that the terminal determines an RS provided for an active TCI state for PDCCH reception in a CORESET with a largest CORESET ID among multiple CORESETs corresponding to the CORESET pool index of the first value as a set of RS resource indices for BFD corresponding to the CORESET pool index of the first value,
wherein a number of BFD-RSs limited by terminal capability information is a number for each of the CORE-SET pool index of the zeroth value and the CORESET pool index of the first value.

4. A system comprising a terminal and a base station, wherein
the terminal comprises:
a receiver that receives, by a higher layer parameter, a control resource set (CORESET) pool index of a zeroth value and a CORESET pool index of a first value that is different from the zeroth value; and
a processor that, in a beam failure detection (BFD)-reference signal (RS) for PCell, PSCell and SCell beam failures, when a set of RS resource indices for BFD corresponding to the CORESET pool index of the zeroth value and a set of RS resource indices for BFD corresponding to the CORESET pool index of the first value are not configured by BFD resource settings, determines an RS provided for an active transmission configuration indication (TCI) state for physical downlink control channel (PDCCH) reception in a CORESET with a largest CORESET ID among multiple CORESETs corresponding to the CORESET pool index of the zeroth value as a set of RS resource indices for BFD corresponding to the CORESET pool index of the zeroth value, and determines an RS provided for an active TCI state for PDCCH reception in a CORESET with a largest CORESET ID among multiple CORESETs corresponding to the CORESET pool index of the first value as a set of RS resource indices for BFD corresponding to the CORESET pool index of the first value, wherein a number of BFD-RSs limited by terminal capability information is a number for each of the CORESET pool index of the zeroth value and the CORESET pool index of the first value, and the base station comprises:

a transmitter that transmits the higher layer parameter.

* * * * *

32